INVENTORS.
F.J. WOOLAM
J. N. WRIGHT
S. G. REQUE
BY
A.M. Fernandez
ATTORNEY 3,178,701
Patented Apr. 13, 1965

3,178,701

ANALOG-TO-DIGITAL CONVERTING SYSTEM

Frank J. Woolam, Mesa, and John N. Wright and Styrk G. Reque, Scottsdale, Ariz., assignors to General Electric Company, a corporation of New York Filed May 14, 1962, Ser. No. 194,461
7 Claims. (Cl. 340—347)

Figure 1:
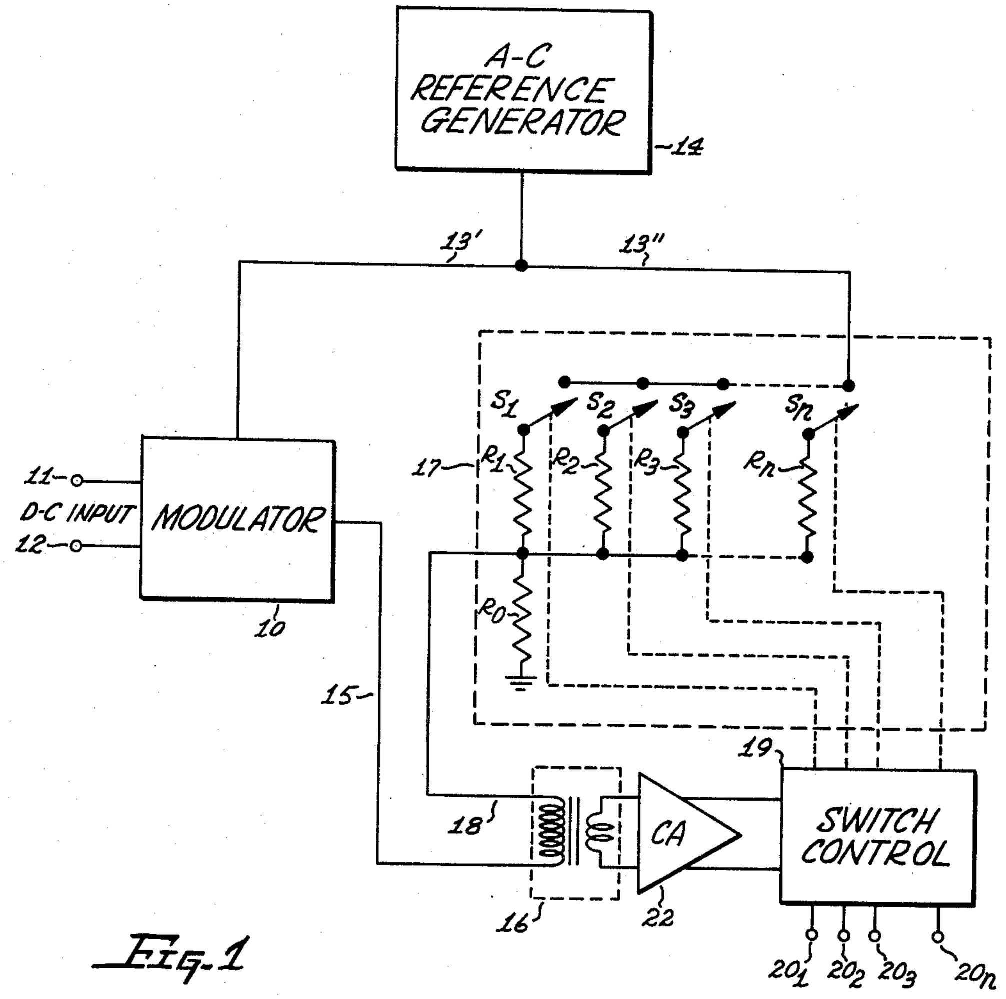

This invention pertains to a system for converting low-level analog signals to digital signals and particularly to a high-speed system adapted to select one of a plurality of low-level analog signals for conversion to digital signals.

It has been common practice to employ a single analog-to digital converting system for selectively converting analog signals on a time-sharing basis. To accomplish that, a switching system has been employed to selectively connect the analog signal to the system, but a problem is encountered when the analog signals to be converted are low-level signals of less than 200 millivolts due to the lack of suitable selecting switches for transmitting the analog signals without attenuation, distortion or noise.

To improve the signal-to-noise ratio in the selecting switch, it is desirable to preamplify the low-level analog signals through a direct-current amplifier of the modulated carrier type. Such an amplifier includes means for modulating the amplitude of a carrier or A.-C. reference signal in accord with the amplitude of the analog signal, a stable A.-C. amplifier and a synchronous demodulator. A disadvantage of that solution to the noise problem is the expense of providing modulated-carrier-type preamplifiers, particularly when there are as many as three or four hundred analog signals to be converted. It is preferable to provide a common amplifier in the system.

A problem encountered with the provison of a common amplifier when the analog signals are very small is the presence of common-mode voltages which are so much greater than the analog signals that they are apt to saturate the common amplifier. A common-mode voltage is any voltage that appears common to both input leads which connect the analog signal source to the amplifier. for accurate analog-to-digital conversion and for high-speed switching of analog signals to the common amplifier, it is necessary to avoid saturating the amplifier by rejecting the common-mode voltage. The design considerations encountered in rejecting the common-mode voltages at increased switching speeds are more severe.

Another important consideration is the necessity of providing a stable reference signal to be used in the digital-to-analog converter portion of the system provided for comparing the digital output with the analog input and, if a modulated-carrier-type amplifier is employed, the necessity of providing a stable A.-C. reference or carrier signal.

The general object of the present invention is to provide an analog-to-digital converting system which overcomes these and other problems.

A more specific object of the present invention is to provide an analog-to-digital converter which obviates the necessity of maintaining constant the amplitude of a reference signal.

Still another object of the invention is to provide a system for converting a selected one of a plurality of analog signals to digital signals in which power amplification and common-mode voltage rejection are achieved economically.

These and other objects are achieved in accordance with the present invention by providing for each analog signal to be converted to digital signals a separate modulator to which a common A.-C. reference signal is applied for modulation and transformer coupling the amplitude-modulated reference signal from a selected modulator directly to a summing circuit to which a signal from a digital-to-analog converter is applied for comparison. The A.-C. difference signal produced by the summing circuit is then employed to control the analog-to-digital converting operation in a conventional manner until the A.-C. difference signal reaches a null amplitude condition.

According to the present invention, the digital-to-analog converter employs the same A.-C. reference signal to provide an A.-C. analog signal for comparison in the summing circuit as is employed in the modulator to provide an amplitude-modulated reference signal. Since the summing circuit provides only the difference between the amplitude-modulated reference signal and the A.-C. analog signal, stability of the reference signal to phase or amplitude is not critical.

The modulator is selected to have a high input impedance and a low output impedance in order to achieve the requisite power gain which is selected to be sufficient to provide for the losses inherent in the semiconductors employed for high-speed switching and in the summing network. In a preferred embodiment, the modulator is a balanced, variable capacitance modulator including two voltage variable, semiconductor diode capacitances serially connected in a bridge circuit with the center-tapped secondary winding of a transformer, the primary winding of which is connected to the A.-C. reference signal source. The analog signal is applied to a pair of input terminals connected to the center tap of the secondary winding and to a junction between the series-connected diodes, respectively. The amplitude-modulated reference signal is coupled by a transformer to the summing circuit via a selecting switch. The primary winding of the output transformer is connected in a series circuit for A.-C. current from the center tap of the A.-C. reference signal input transformer and the junction between the two series-connected diodes; a capacitor in that series circuit provides D.-C. isolation of the analog input terminals.

Figure 2:
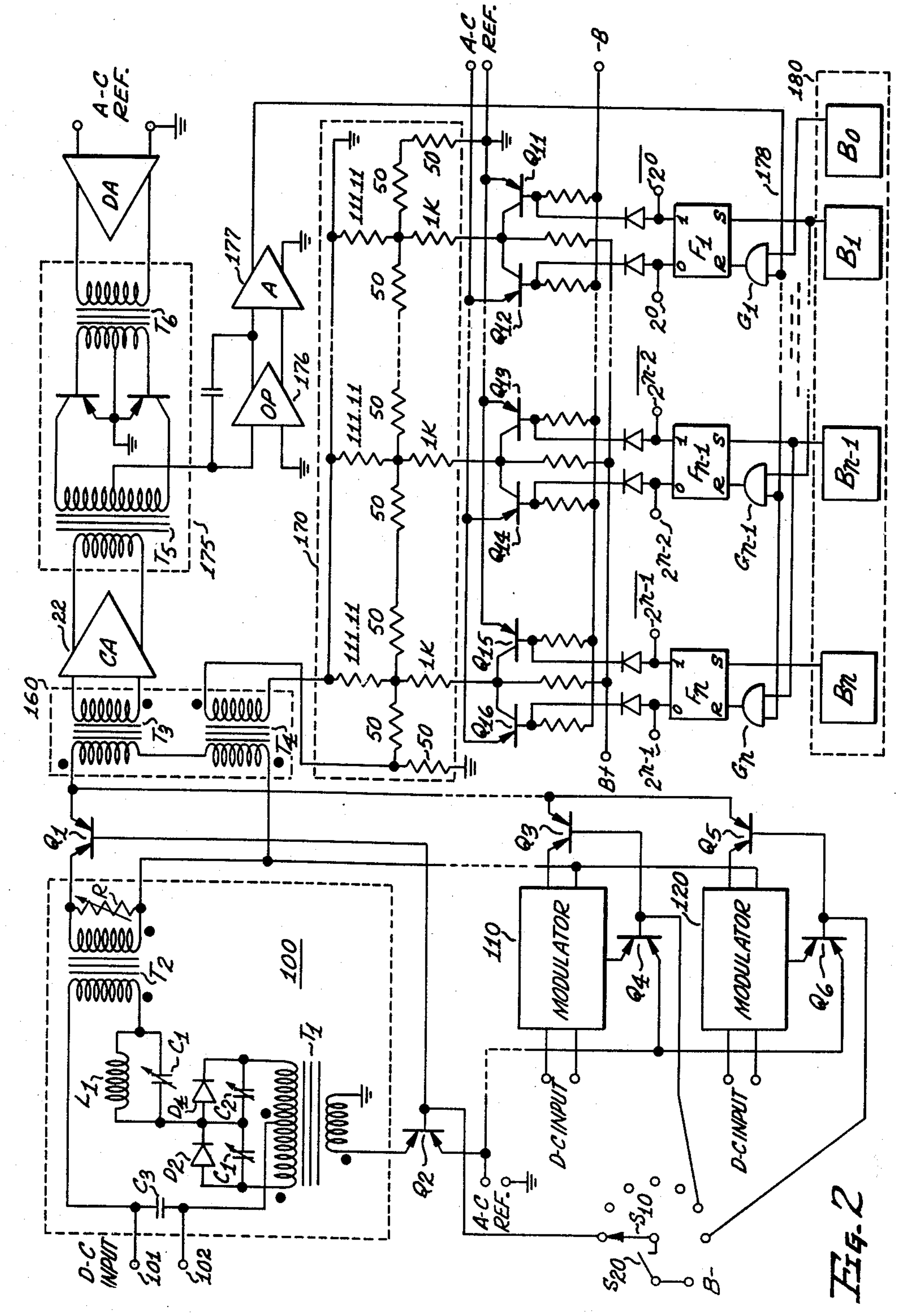

Other objects and advantages will become apparent from the following description with reference to the drawings in which:

FIG. 1 is a schematic diagram illustrating the basic principles of the present invention; and FIG. 2 is a schematic diagram of a preferred embodiment of the present invention.

Referring now to FIG. 1, a modulator 10 having a pair of input terminals 11 and 12 for receiving an analog signal is provided to modulate an A.-C. reference signal transmitted over a line 13′ from a generator 14 to transmit an amplitude-modulated reference signal over a line 15 to a summing circuit 16 which also receives an A.-C. analog signal from a digital-to-analog converter 17 over a line 18. The digital-to-analog converter 17 is provided to convert a digitally coded word stored in a switch control section 19 to an A.-C. analog signal in accordance with its numerical value. The digital-to-analog converter 17 receives the A.-C. reference signal over a line 13″ which is connected to a plurality of weighted resistors $R_1$ to $R_n$ through respective switches $S_1$ to $S_n$. The resistance values of the weighted resistors $R_1$ to $R_n$ diminish in accordance with the weight of each binary digit in the digitally coded word. The switch-control section 19 closes respective ones of the switches $S_1$ to $S_n$ in an orderly manner in accord with the presence of a binary digit 1 in respective orders of the digitally coded word stored therein and presented at corresponding digital output terminals $\mathbf{20}_1$ to $\mathbf{20}_n$.

A summing resistor $R_0$ is provided to add the currents through the weighted resistors $R_1$ to $R_n$ as they are connected to the line 19 by the switches $S_1$ to $S_n$ as they are closed, thereby providing an A.-C. analog signal proportional to the numerical value of the digitally coded word stored in the switch control section 19. The summing circuit 16, illustrated as a transformer having one terminal of its primary winding connected to the modulator 10 by the line 15 and the other terminal connected to the analog-to-digital converter 17 by the line 18, functions to transmit an A.-C. difference signal to a carrier amplifier 22.

The difference signal amplified by the carrier amplifier 22 is applied to the switch-control section 19 which demodulates, filters and applies it as a D.-C. error signal to control the open and closed condition of the switches $S_1$ to $S_n$ such that the A.-C. analog signal from the digital-to-analog converter 17 is made equal in amplitude to the amplitude-modulated reference signal, whereby the A.-C. difference signal is caused to reach a null amplitude condition and the D.-C. error signal in the switch-control section is made equal to zero volts.

It should be understood that the summing circuit 16 and the digital-to-analog converter 17 are illustrated in FIG. 1 schematically and that the symbols employed are intended to represent any suitable summing circuit and digital-to-analog converter. The design of suitable summing circuits is discussed by Walter W. Soroka in chapter 2 of Analog Methods in Computation and Simulation, McGraw-Hill Book Co. (1954). The design of a suitable switch control for a digital-to-analog converter in a system for analog-to-digital conversion is described in chapter 20, section 6, of the Handbook of Automation Computation and Control, John Wiley & Sons, Inc. (1958). Other designs have been employed in the past for summing and analog converting operations and it is expected that new designs which may be employed to practice the present invention may be developed; accordingly, the symbols employed in FIG. 1 are to be understood to be generic. For example, the switches $S_1$ to $S_n$ would, in a preferred embodiment, be semiconductor switches.

The advantage of the present invention is that the A.-C. reference amplitude does not affect the analog-to-digital converting operation because any effect a change in A.-C. reference signal amplitude may have on the modulator is made correspondingly to the digital-to-analog converter so that the proportionality between the amplitude-modulated reference signal and the A.-C. analog signal remains constant. Unequal changes in the modulator and the digital-to-analog converter due to ambient temperature conditions could have an adverse effect if the overall temperature coefficient of the modulator is not equal to the temperature coefficient of the digital-to-analog converter, but the components employed in the modulator and the digital-to-analog converter are preferably so selected as to minimize the effect of any difference in the temperature coefficients.

A preferred embodiment of the present invention is illustrated in FIG. 2. A common analog-to-digital converting channel is employed to convert analog signals from a plurality of measuring devices or transducers (not shown) connected to modulators 100, 110 and 120. The switching circuits for effectively coupling the analog signals to the common amplifier 22 are comprised of transistor switches $Q_1$ to $Q_6$. The A.-C. reference signal is selectively coupled to the modulators by the transistor switches $Q_2$, $Q_4$ and $Q_6$, and the amplitude-modulated reference signals are selectively coupled to a common summing circuit 160 by the transistors $Q_1$, $Q_3$ and $Q_5$ in response to the selective setting of a switch $S_{10}$. Although the switch $S_{10}$ is illustrated as a rotary switch, it is to be understood that its function is preferably performed by a high-speed switching circuit, such as a diode switching matrix so designed as to selectively bias the transistor switches into conduction by applying a negative potential to their base electrodes through a switch $S_{20}$ which is closed only after the selection has been made and the analog-to-digital converting system has been reset by means not shown.

The switching transistors $Q_1$ to $Q_6$ are illustrated as being transistors having symmetrical properties of the type described by G. C. Sziklai in an article entitled "Symmetrical Properties of Transistors and Their Applications" published in the Proceedings of the IRE, volume 41 (June 1953) at pages 717 to 724. A symmetrical transistor provides a fast bi-directional switch which conducts emitter current in either direction as long as negative bias is applied to its base electrode.

The modulators are essentially low-frequency, semiconductor parametric amplifiers employed as amplitude modulators in the following manner. Referring to the modulator 100, the low-frequency or analog signal is applied to input terminals 101 and 102 and an A.-C. reference signal is applied to the primary winding of a center-tapped transformer $T_1$ through the transistor switch $Q_2$. Two variable-capacitance silicon junction diodes $D_1$ and $D_2$ are serially connected between opposite terminals of the center-tapped secondary winding of the transformer $T_1$ to form a capacitance bridge circuit.

The input terminal 102 is directly connected to the center tap of the secondary winding of the transformer $T_1$ to provide a D.-C. current path to the anode of the diode $D_2$ and the cathode of the diode $D_1$. The input terminal 101 is connected to the cathode of the diode $D_2$ and the anode of the diode $D_1$ through the primary winding of an output transformer $T_2$ and an inductance coil $L_1$. It can be shown that the amplitude of the modulated reference signal across the secondary winding of the transformer $T_2$ is proportional to the analog signal applied to the diodes $D_1$ and $D_2$ because the modulated A.-C. reference signal will have an amplitude proportional to any bridge unbalance caused by the analog signal oppositely applied to the diodes $D_1$ and $D_2$.

Capacitors $C_1$ and $C_2$ are connected in parallel with diodes $D_1$ and $D_2$, respectively, and adjusted to balance the bridge with a zero input signal, thereby compensating for any difference in diode capacitance without any input signal. It should be noted that the diodes $D_1$ and $D_2$ will function as variable capacitances to provide modulation only until there is forward conduction through either of the diodes. Thus, in the configuration illustrated, the modulator is purposely limited to an A.-C. reference signal having an amplitude between 150 and 200 millivolts with a full-scale analog signal input of approximately 10 millivolts. An attenuator (not shown) is provided between the analog signal source and the input terminals to assure that the full-scale analog signal does not exceed that limitation. If higher analog signals are to be converted, or an A.-C. reference signal of higher amplitude is to be employed to achieve greater power gain, a reverse bias should be applied to the series-connected diodes $D_1$ and $D_2$ to assure that neither will become forward biased during operation. Such a reverse bias is purposely omitted in the preferred embodiment of the invention illustrated because it is intended to be used for low-level analog signals and the design of the modulator provides sensitivity to signals of 2½ microvolts. If a reverse bias were to be applied, the power supply employed to provide the bias would necessarily have to be so regulated as to provide a D.-C. potential that would not vary over a fraction of 2½ microvolts.

This simple and inexpensive modulator produces very little noise and will provide a modulated reference signal having an amplitude proportional to the input analog signal as long as the A.-C. reference signal amplitude is maintained constant. As noted hereinbefore, the A.-C. reference signal is also employed to provide an A.-C. analog signal for comparison in the summing circuit 160 so that any variation in the amplitude of the A.-C. reference signal will not affect the accuracy of the system. However, variations in the capacitance of the diodes $D_1$ and $D_2$ in response to ambient temperature conditions will produce an error, referred to as the zero-drift error, in the amplitude-modulated reference signal.

It can be shown that the variations in diode capacitance in response to ambient temperature is due to variations in the contact potential of the diode, the nominal rate of change of which is 2 millivolts per degree centigrade. Therefore, to provide a low-drift modulator, the rate of change of the contact potential of the two diodes $D_1$ and $D_2$ with temperature should be matched. For instance, if the temperature coefficient of the two diode capacitances is matched to within .01% per degree centigrade, the zero-drift error will be less than 60 microvolts per degree centigrade with a reference signal amplitude of about 100 millivolts. The task of matching diodes is not an arduous one and diode pairs having a difference in temperature coefficient of less than .005% per degree centigrade often may be found.

In order that error due to noise in the system may be kept very low, the modulator is designed to provide good power gain. The requisite power gain may be achieved by providing a high input impedance for the analog signal in the order of 50 megohms and a low output impedance in the order of 50 ohms for the amplitude-modulated reference signal. The primary winding of the transformer $T_2$ in the output circuit is connected in series with the inductance coil $L_1$ and a capacitor $C_3$ which provides an A.-C. current path for the A.-C. output signal and isolates the input terminals 101 and 102. The inductance of the coil $L_1$ is selected to provide a series-resonant circuit for a low output impedance of approximately 50 ohms by making the inductive reactance of the coil $L_1$ and the primary winding of the transformer $T_2$ equal to the sum of the capacitive reactance of the diodes $D_1$ and $D_2$ and the capacitors $C_1$ and $C_2$. A fourth capacitor $C_4$ is provided to tune the series-resonant circuit to the frequency of the A.-C. reference signal source. A resistor R is connected in parallel with the secondary winding of the transformer $T_2$ to adjust the output impedance of the modulator for the desired power transfer.

In practice, matched pairs of diodes may be obtained through a reasonable effort of selection which will produce a zero-drift error of about 20 microvolts per degree centigrade. Through more careful selection of diodes, or control of environment temperature, zero-drift errors of as low as 2 microvolts per degree centigrade may be achieved. With a zero drift of less than 2 microvolts and a modulator sensitivity of 2½ microvolts, resolution of the analog-to-digital converter for a full-scale input signal of 10 millivolts is 1 in 4,096 with a digital signal output of 12 binary digits. In order that the resolution for the system may be uniform for the different modulators having different input signal sources, the power transfer from each may be individually adjusted.

The summing circuit 160 illustrated is a transformer adder having a first transformer $T_3$ for coupling an A.-C. difference signal to the carrier amplifier 22 and a second transformer $T_4$ for applying an A.-C. analog signal of opposite phase to the primary winding of the transformer $T_3$. The difference signal applied to the carrier amplifier 22 may be in or out of phase with the A.-C. reference signal, depending upon whether the amplitude-modulated reference signal is greater than or less than the A.-C. analog signal from the digital-to-analog converter.

The digital-to-analog converter comprises a ladder-type matrix 170 of current-dividing resistors controlled by transistor switches $Q_{11}$ to $Q_{16}$ which function to provide an A.-C. analog signal in accordance with the numerical value of a digitally coded word stored in a register comprising flip-flops $F_1$ to $F_n$. The matrix 170 is designed to provide an output impedance of about 50 ohms and the turns ratio of the transformer $T_4$ is selected to provide a very low impedance of about 1 ohm in series with the primary winding of the transformer $T_3$ in order that the 50 ohm input impedance of the carrier amplifier 22 will approximately match the combined impedance of the modulator and the transformed impedance of the matrix 170. The exact match required for the desired power transfer may be obtained by adjusting the resistor R in the modulator.

The difference signal from the carrier amplifier 22 is applied to a synchronous demodulator 175 through an input transformer $T_5$ having a center-tapped secondary winding connected to an integrating operational amplifier 176 which provides a D.-C. output signal that may be positive or negative according to the phase of the difference signal which depends upon whether the A.-C. analog signal is greater than or less than the amplitude-modulated reference signal. The design of the demodulator is so selected as to provide rejection of an undesirable quadrature signal component that is 90 degrees out of phase with the reference signal.

An amplifier 177 is connected to the operational amplifier 176 to provide a positive output signal of predetermined amplitude only when the D.-C. output signal of the operational amplifier 176 is positive, i.e., when the A.-C. analog signal is greater than the amplitude-modulated reference signal; it provides a zero-volt signal at all other times.

The error signal is transmitted over a line 178 to a group of AND-gates $G_1$ to $G_n$ which are employed to control the analog-to-digital conversion by a method of successive approximation as described at pages 20–63 of the Handbook of Automation Computation and Control, volume 2. In general, the method consists of first inserting a binary digit 1 in the most significant order flip-flop $F_n$ and converting that binary digit having a value of $2n-1$ to an A.-C. analog signal of proportional value by turning off the switch $Q_{15}$ and turning on the switch $Q_{16}$, thereby allowing the A.-C. reference signal to be transmitted through current-dividing sections of the digital-to-analog converting matrix 170 to the summing circuit 160. If that A.-C. analog signal is greater than the amplitude-modulated reference signal, a positive error signal is transmitted over the line 178 to the AND-gate $G_n$.

The flip-flop $F_n$ is set when a binary digit 1 is inserted therein in the first step of the converting operation by a shift register 180 having flip-flops $B_0$ to $B_n$. To accomplish that, a binary digit 1 is shifted into the register to set the flip-flop $B_n$ which in turn sets the flip-flop $F_n$. In the second step of the converting operation, the binary digit 1 in the flip-flop $B_n$ is shifted into the flip-flop $B_{n-2}$ to set the flip-flop $F_{n-1}$ and, if the error signal on the line 178 is positive, to reset the flip-flop $F_n$. If the A.-C. analog signal transmitted to the summing circuit 160 is not greater than the amplitude-modulated reference signal, the error signal on line 178 is zero volts and the flip-flop $F_n$ is not reset when the flip-flop $F_{n-1}$ is set.

The steps are repeated until the flip-flop $B_1$ is set to reset the flip-flop $F_2$ (not shown) as required and to set the flip-flop $F_1$. Thereafter, the binary digit 1 in the shift register is transferred to the flip-flop $B_0$ to reset the flip-flop $F_1$ in the least significant order as required. In that manner, only $n+1$ steps are required to convert an analog signal to a digitally coded word, one step for each order and one additional step to reset the flip-flop $F_1$ in the least significant order if the binary digit 1 added to the binary number causes the A.-C. analog signal to exceed the amplitude-modulated reference signal.

The timing and control circuits for the shift register 180, and other control circuits, are not shown since the design of the control circuits is routine and must necessarily depend upon the environment in which the analog-to-digital converting system is to be employed. For instance, if the plurality of analog signals are to be converted or a single analog signal is to be repeatedly converted, it is necessary to reset the shift register 180 and the flip-flops $F_1$ to $F_n$ when the conversion of an analog signal is initiated. That may be readily accomplished by a control circuit responsive to the initial closing of the switch $S_{20}$ in the illustrated system.

Although the section for controlling the switches $Q_{11}$ to $Q_{16}$ is illustrated as being of the type utilizing the successive approximation method, it should be understood that it may be of any other type. For instance, the switch-control section may be implemented with a reversible counter in place of the flip-flops $F_1$ to $F_n$ for continuous conversion of the analog input signal to a digitally coded word. The error signal transmitted over the line 178 would then be employed to cause the counter to count in either the forward or reverse direction depending upon whether the A.-C. analog signal is less than or greater than the amplitude-modulated reference signal.

While the principles of the invention have now been made clear in an illustrative embodiment, there will be immediately obvious to those skilled in the art many modifications in structure, arrangement, proportions, the elements, materials, and components, used in the practice of the invention, and otherwise, which are particularly adapted for specific environments and operating requirements, without departing from those principles. The appended claims are therefore intended to cover and embrace any such modifications, within the limits only of the true spirit and scope of the invention.

What is claimed is:

1. In a system for converting a D.-C. analog signal to a digitally coded word having a numerical value proportional to the amplitude of said D.-C. analog signal, the combination comprising:

an A.-C. reference signal source;

first means coupled to said A.-C. reference signal source for converting said D.-C. analog signal to an amplitude-modulated carrier signal;

a digital-to-analog converter including a second means coupled to said A.-C. reference signal source for converting a digitally coded word to an A.-C. analog signal in accordance with the numerical value of the digitally coded word;

summing means coupled to said first and second means for providing a signal having an amplitude equal to the difference between the amplitude of the modulated carrier signal and the amplitude of said A.-C. analog signal; and control means, including a register for storing said digitally coded word, responsive to a different signal from said summing means for causing said digitally coded word stored in said register to be so altered as to change its numerical value until the difference signal reaches a null amplitude condition.

2. In a system for converting a D.-C. analog signal to a digitally coded word having a numerical value proportional to the amplitude of said D.-C. analog signal, the combination comprising:

an A.-C. reference signal source;

first means coupled to said A.-C. reference signal source for converting said D.-C. analog signal to an amplitude-modulated carrier signal;

a digital-to-analog converter including a second means coupled to said A.-C. reference signal source for converting a digitally coded word to an A.-C. analog signal in accordance with the numerical value of the digitally coded word;

an A.-C. summing means coupled to said first and second means for providing A.-C. difference signal having an amplitude equal to the difference between the amplitude of the modulated carrier signal and the amplitude of said A.-C. analog signal, and having a phase representative of the algebric sign of said difference;

detecting means coupled to said summing means for detecting the amplitude and phase of said A.-C. difference signal; and controls means, including a register for storing said digitally coded word, responsive to said A.-C. difference signal from said detecting means for causing said digitally coded word stored in said register to be so altered as to change its numerical value until the A.-C. difference signal reaches a null amplitude condition.

3. In a system for converting a D.-C. analog signal to a digitally coded word having a numerical value proportional to the amplitude of said D.-C. analog signal, the combination comprising:

an A.-C. reference signal source;

a power-amplifying means coupled to said A.-C. reference signal source for converting said D.-C. analog signal to an amplitude-modulated carrier signal;

digital-to-analog converter including a second means coupled to said A.-C. reference signal source for converting a digitally coded word to an A.-C. analog signal in accordance with the numerical value of the digitally coded word;

summing means coupled to said power-amplifying and second means for providing a signal having an amplitude equal to the difference between the amplitude of the modulated carrier signal and the amplitude of said A.-C. analog signal; and control means, including a register for storing said digitally coded word, responsive to a difference signal from said summing means for causing said digitally coded word stored in said register to be so altered as to change its numerical value until the difference signal reaches a null amplitude condition.

4. In a system for converting a D.-C. analog signal to a digitally coded word having a numerical value proportional to the amplitude of said D.-C. analog signal, the combination comprising:

an A.-C. reference signal source;

a first means coupled to said A.-C. reference signal source for converting said D.-C. analog signal to an amplitude-modulated carrier signal, said first means having a high input impedance and a low output impedance for power gain;

a digital-to-analog converter including a second means coupled to said A.-C. reference signal source for converting a digitally coded word to an A.-C. analog signal in accordance with the numerical value of the digitally coded word;

summing means coupled to said first and second means for providing a signal having an amplitude equal to the difference between the amplitude of the modulated carrier signal and the amplitude of said A.-C. analog signal; and control means, including a register for storing said digitally coded word, responsive to a difference signal from said summing means for causing said digitally coded word stored in said register to be so altered as to change its numerical value until the difference signal reaches a null amplitude condition.

5. In a system for converting a D.-C. analog signal to a digitally coded word having a numerical value proportional to the amplitude of said D.-C. analog signal, the combination comprising:

an A.-C. reference signal source;

a semiconductor parametric amplifier coupled to said A.-C. reference signal source for converting said D.-C. analog signal an amplitude-modulated carrier signal;

a digital-to-analog converter including a digital-to-analog converting means coupled to said A.-C. reference signal source for converting a digitally coded word to an A.-C. analog signal in accordance with the numerical value of the digitally coded word;

summing means coupled to a semiconductor parametric amplifier and to said digital-to-analog converting means for providing a signal having an amplitude equal to the amplitude difference between the amplitude-modulated carrier signal and the A.-C. analog signal; and control means, including a register for storing said digitally coded word, responsive to a difference signal from said summing means for causing said digitally coded word stored in said register to be so altered as to change its numerical value until the difference signal reaches a null amplitude condition.

6. In a system for converting a D.-C. analog signal to a digitally coded word having a numerical value proportional to the amplitude of said D.-C. analog signal, the combination comprising:

an A.-C. reference signal source;

a balanced bridge-type modulator including two semiconductor diodes serially connected in a bridge circuit with the center-tapped secondary winding of a transformer the primary winding of which is connected to said A.-C. reference signal source, means for coupling first and second input terminals adapted to receive a D.-C. analog signal to the center tap of said secondary winding and to a junction between said diodes, respectively, and means for translating an amplitude-modulated carrier signal out of said bridge circuit;

summing means coupled to said balanced bridge-type modulator for providing a signal having an amplitude equal to the difference between the amplitude of the modulated carrier signal and the amplitude of said A.-C. analog signal; and control means, including a register for storing said digitally coded word, responsive to a difference signal from said summing means for causing said digitally coded word stored in said register to be so altered as to change its numerical value until the difference signal reaches a null amplitude condition.

7. A system for converting a selected one of a plurality of D.-C. analog signals to a digitally coded word having a numerical value proportional to the amplitude of the selected D.-C. analog signal, the combination comprising:

an A.-C. reference signal source;

a plurality of modulating means for converting a D.-C. analog signal to an amplitude-modulated carrier signal, one for each of said plurality of D.C. analog signals;

first switching means for selectively coupling said A.-C. reference signal source to a given modulating means for selectively converting a given D.-C. analog signal to an amplitude-modulated carrier signal;

a digital-to-analog converter coupled to said A.-C. reference signal source for converting a digitally coded word to an A.C. analog signal in accordance with the numerical value of the digitally coded word;

summing means coupled to said digital-to-analog converter for providing a signal having an amplitude equal to the difference between the amplitude of a modulated carrier signal from a selected modulating means and the amplitude of said A.-C. analog signal;

second switching means for selectively coupling the amplitude-modulated carrier signal from said selected modulating means to said summing means; and control means, including a register for storing said digitally coded word, responsive to a difference signal from said summing means for causing said digitally coded word stored in said register to be so altered as to change its numerical value until the difference signal reaches a null amplitude condition.

References Cited by the Examiner

UNITED STATES PATENTS 2,988,737 6/61 Schroeder ------------ 340—347

MALCOLM A. MORRISON, *Primary Examiner.*